United States Patent [19]

Munyon et al.

[11] Patent Number: 4,947,284

[45] Date of Patent: Aug. 7, 1990

[54] FIELD-INSTALLABLE HEAVY DUTY UNDERVOLTAGE RELEASE

[75] Inventors: Todd Munyon, Cedar Rapids, Iowa; Chris Toarmina, St. Louis, Mo.

[73] Assignee: Square D Company, Palatine, Ill.

[21] Appl. No.: 320,022

[22] Filed: Mar. 6, 1989

[51] Int. Cl.[5] ........................ H02H 3/24; H01H 83/00

[52] U.S. Cl. ........................................ 361/92; 361/115; 361/152; 361/210; 335/20; 335/254

[58] Field of Search .................. 361/92, 102, 115, 152, 361/154, 189, 210; 335/18, 19, 259, 267, 20, 179, 254

[56] References Cited

U.S. PATENT DOCUMENTS

| | | | |
|---|---|---|---|
| 2,365,957 | 12/1944 | Holslag | 200/98 |
| 2,472,553 | 6/1949 | Theunissen | 361/210 |
| 3,551,754 | 12/1970 | Shaffer | 361/210 |
| 3,708,723 | 1/1973 | Shand et al. | 335/179 |
| 3,790,862 | 2/1974 | Kampf et al. | 361/152 |
| 3,922,624 | 11/1975 | Basile | 335/26 |
| 4,013,926 | 3/1977 | Lang et al. | 361/115 |
| 4,609,965 | 9/1986 | Baker | 361/154 |
| 4,675,776 | 6/1987 | Howell | 361/92 |
| 4,706,158 | 11/1987 | Todaro et al. | 361/92 |
| 4,788,621 | 11/1988 | Russell et al. | 361/92 |

*Primary Examiner*—Todd E. Deboer
*Attorney, Agent, or Firm*—Jose W. Jimenez

[57] ABSTRACT

An undervoltage tripping unit for a power line circuit breaker features a holding solenoid and a boostig solenoid having their associated plungers coupled to move together so as to be retracted against the force of plunger biasing springs when both solenoids are energized. Release of the plungers from the retracted position is used to trip the associated power line circuit breaker when the line voltage falls below a tripping voltage level. The holding solenoid is continuously coupled to the circuit breaker power input terminals. The booster solenoid is energized through a plunger-actuated switch so as to be de-energized when the plungers are fully retracted or in a position proximate thereto.

13 Claims, 2 Drawing Sheets

FIELD-INSTALLABLE HEAVY DUTY UNDERVOLTAGE RELEASE

TECHNICAL FIELD

The technical field of the invention is the electrical circuit breaker art.

BACKGROUND PRIOR ART

It has long been known that intermittent drops of power line voltage below certain values caused by power network distribution malfunction can damage various kinds of electric motors and related machinery. Such power line voltage drops can come in two forms. One is the simple power outage wherein the power line voltage drops to zero, and is typically restored in a period of minutes to hours thereafter. This type of power line failure is not particularly damaging, since sensitive electric motors are not forced to operate for a significant period of time at reduced voltage levels, but are simply shut down. The second type consists of outages wherein the power line voltage drops below a safe operating value for periods of several seconds or longer, which may be long enough to damage such equipment.

A well-known solution is to provide for such sensitive installations an undervoltage release unit (tripping unit) which will respond immediately to any power line voltage drop below a given power line voltage (tripping voltage) to actuate an associated circuit breaker to an open circuit condition. The circuit breaker and its associated tripping unit are normally configured so that when the power line voltage drops below the tripping level, the circuit breaker is actuated by the tripping unit to an open-circuit condition and requires subsequent manual resetting by attendant personnel to a closed-circuit condition.

It is during this subsequent reset operation that problems arise. If the operator attempts to reset the circuit breaker before the line voltage is established at a sufficiently high value (reset voltage) the momentary high start-up current of the associated load may reduce the line voltage below the tripping voltage resulting in the circuit breaker opening under high current transient conditions which are very damaging to the circuit breaker contacts.

To obviate such problems, it is known in the art to provide an extension arm or member (release member) operatively coupled to the circuit breaker mechanism and engageable with a solenoid energized from the power line. The solenoid has associated therewith a spring-biased plunger operable between an extended and a retracted position. When the line voltage drops below the tripping level the solenoid releases the plunger, which under the influence of the bias spring, extends to strike the release member to trip the circuit breaker open. Resetting of the circuit breaker is prevented by the spring extended plunger engaging the release member.

In the case of heavy duty circuit breakers this typically requires a relatively massive solenoid coil and a relatively heavy duty plunger spring, leading to space problems and coil heating problems. The solenoid must be capable of retracting plunger at a given reset voltage and thereafter retaining it. Even without such a reset inhibiting feature, powerful solenoids may be necessary for high current circuit breakers that require strong springs to trip the circuit breaker.

There remains a need for a tripping unit (undervoltage release unit) of relatively modest size that is capable of producing a strong tripping force when the line voltage drops below the tripping level, and providing adequate retraction force when the line voltage is once again established at a reset voltage substantially higher than the tripping voltage.

SUMMARY OF INVENTION

According to a feature of the invention a solenoid assembly, preferably in the form of a pair of solenoids having plungers coupled so as to move together, uses one solenoid as an undervoltage (holding) solenoid that is connected across the line terminals of a circuit breaker unit and has adequate strength to maintain the plungers in a retracted position at line voltages down to the tripping level. A momentary drop of the line voltage below this level will release the plungers to be urged to an extended position under the force of their biasing springs to strike an internal release member within the circuit breaker to open the circuit breaker. The second solenoid serves as a reset (booster) element, and is provided with a de-energizing switch in series with its coil and the line terminals, the switch being configured so that it is operated by plunger movement and is off when the plungers are in the fully retracted position.

Thus, during normal line voltage conditions with the plungers retracted the booster solenoid is energized. The solenoid switch is disposed so that it opens only when the plungers are fully seated or are close to fully seated. Therefore, even though the booster solenoid is de-energized before full plunger retraction is achieved, the kinetic energy of the system is sufficient to carry the plungers to the fully seated position. Once the holding solenoid plunger is fully seated, the voltage necessary to maintain it in the seated position against the spring forces is markedly reduced. This latter voltage establishes the tripping voltage level of the unit. When the plungers extend during a line voltage drop, the booster solenoid will be energized soon after the plunger motion is initiated; however, now the line voltage is below the tripping voltage, i.e. at a relatively low value. The booster solenoid has insufficient strength to return the plungers to a seated position, so they therefore quickly extend to trip the circuit breaker. An optional low-permeability gap is inserted into the magnetic return structure of the holding solenoid to vary the tripping voltage. In the preferred form of the invention both solenoids are energized through rectifying diodes to minimize vibration and buzzing.

The booster solenoid is thus normally subject to a very short duty cycle, being only momentarily energized during plunger retraction. Thus, the booster solenoid may be operated beyond its safe continuous power rating at normal line voltages, allowing for substantial size reduction of the tripping unit. In the preferred form of the invention the tripping unit is designed to be field-installable and field-replaceable with respect to existing circuit breaker units.

DETAILED DESCRIPTION

Figure 1:
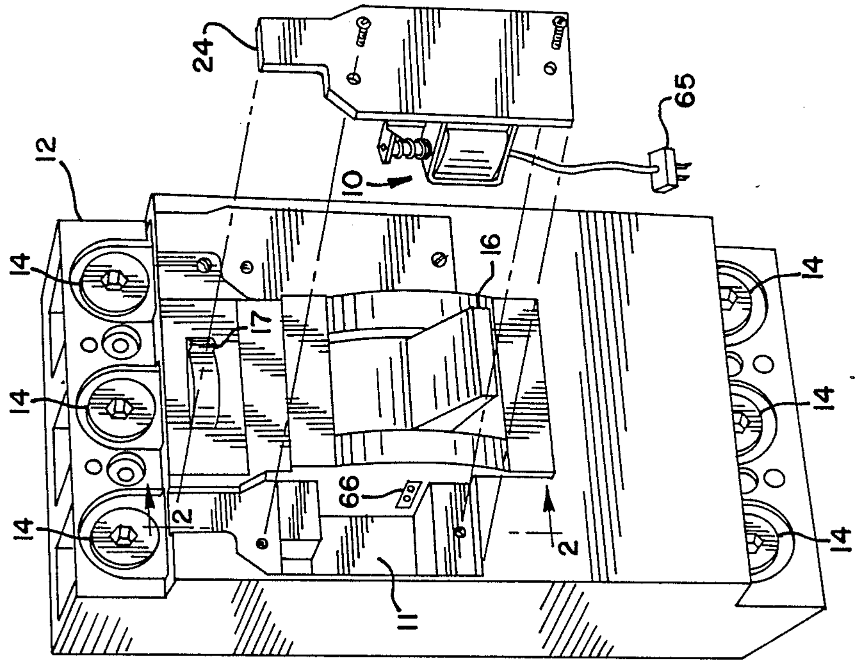
FIG. 1 is a perspective view of a circuit breaker housing showing the tripping unit of the present invention positioned for insertion thereinto.

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to the embodiment illustrated.

The instant invention is oriented towards an undervoltage protector used to trip a power line circuit breaker when the voltage thereon drops below a given tripping level, and which additionally hinders (or absolutely prevents) resetting the main circuit breaker to a closed condition until the power line voltage is subsequently established above a reset voltage level significantly above the tripping level.

Referring now to the figures, FIG. 1 shows an undervoltage tripping unit 10 positioned for insertion into a well 11 in a housing 12. Mounted on the housing 12 are line and load lug terminals 14 for connection to the power lines and the loads to be protected. Inside the housing 12, and not shown in the drawings, is a power line circuit breaker switch actuatable to a closed condition by movement of a reset lever 16. A field-adjustable magnetic trip adjustment is frequently provided. The adjustment of the tripping unit responsive to movement of a lever 17 extending from the breaker housing 12 varies the level of current at which the circuit breaker will trip under short circuit conditions. A release arm 18 (FIG. 2A) is disposed within the housing well 11 and linked to the reset lever 16 so that movement of the release arm will trip the power line circuit breaker to a circuit-breaking condition. The function of the undervoltage tripping unit 10 (undervoltage release unit) is to force the release arm 18 upwards to open the circuit breaker when the power line voltage drops below a given tripping value. The tripping unit 10 of the instant invention is designed to be installed in the field as a replacement for older type circuit breakers, being dimensioned to fit within the well 11 as shown in FIG. 1.

Figure 2A:
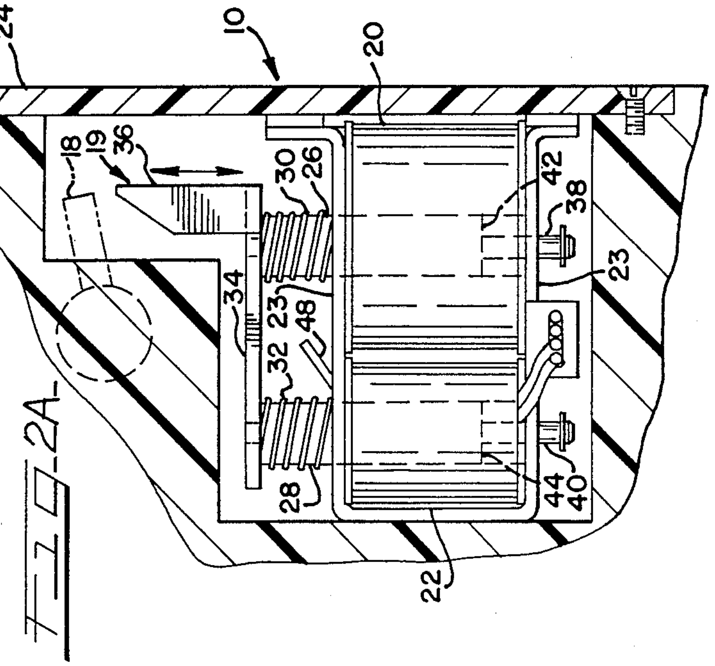
FIG. 2A is a partially cutaway region of the assembly shown in FIG. 1 with the circuit breaker installed, the view being taken along the cut lines 2—2 indicated in FIG. 1.
Figure 2B:
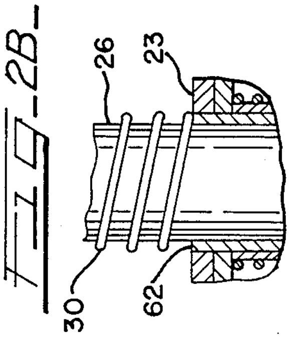
FIG. 2B is a partially cutaway view of a portion of the undervoltage release shown in FIG. 2A.
Figure 3:
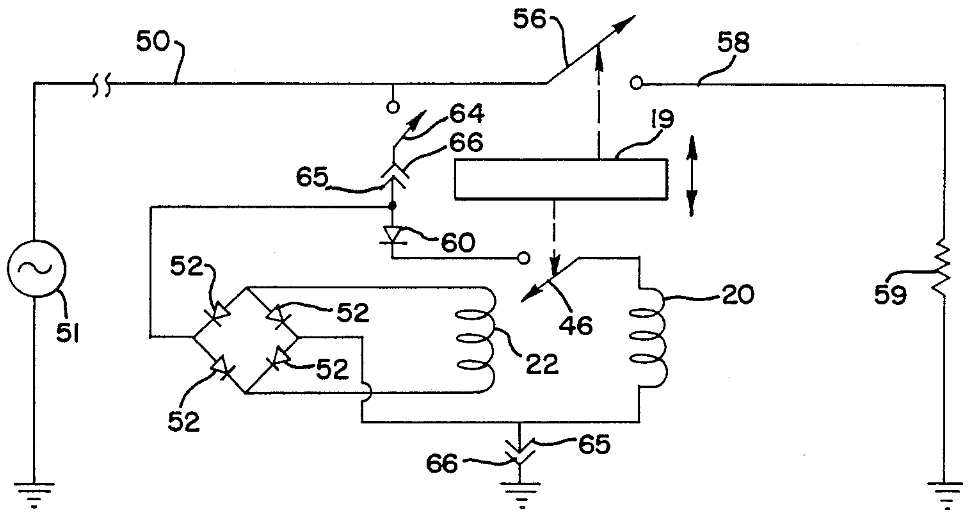
FIG. 3 is a schematic circuit showing the elements of the undervoltage release as connected to a main circuit breaker switch and input and output power lines.

Referring now to FIGS. 2A, 2B, and 3, the tripping unit 10 consists of a booster (reset) solenoid 20 and a holding (undervoltage) solenoid 22 mounted on a common magnetically permeable frame 23 affixed to a mounting plate 24. Each solenoid has a plunger 26, 28 slidably mounted therein, each plunger having coaxially affixed thereto a compression spring 30, 32 compressively bearing against a face of permeable frame 23 and a yoke 34 mechanically securing the outer ends of the plungers together to form a plunger assembly 19. Affixed to one end of the yoke 34 is a yoke extension 36 disposed to force the release arm 18 upwards to trip the circuit breaker when insufficient voltage is supplied to the tripping unit 10.

Each of the plungers 26, 28 has coaxially affixed thereto a reduced diameter plunger extension 38, 40 passing through the opposite face of the frame 23, each extension extending from an otherwise planar plunger face 42, 44 which, when in contact with its confronting region of the permeable frame 23 forms a low reluctance magnetic path thereto. In series with the booster solenoid 20 is a disabling switch 46 (not physically shown) having an actuating arm 48 disposed to be engaged by the yoke 34 upon retraction of the plungers 26, 28 to break the flow of power to the booster solenoid from the input side 50 of the power lines. Referring in particular to FIG. 3, it will be seen that electrical power is delivered via power line 50 from a power source 51 through electrical connectors 65, 66, representing the connector plug 65 and socket 66 shown in FIG. 1 through diode rectifiers 52, 60 to the booster solenoid 20 and the holding solenoid 22. It will be noted that the holding solenoid 22 is powered at all times from the power line through a full-wave bridge rectifier consisting of the four diodes 52—52.

The plunger assembly 19 is shown coupled to operate the disabling switch 46 and also to operate the power line circuit breaker 56, this circuit breaker serving to connect or disconnect the power line 50 from line 58 that is feeding associated load 59.

The booster solenoid 20 is provided with half-wave rectified power from the power line 50 through diode 60 connected in series with the disabling switch 46. The plunger assembly 19 of tripping unit assembly 10 is shown in FIG. 2A in its extended position preventing clockwise rotation of the release arm 18, thus hindering operation of the reset lever 16 to close the circuit breaker switch 56.

When the line voltage rises above a given reset voltage both of the solenoids 20, 22 will be energized to a sufficient degree to accelerate plunger assembly 19 downward towards a seated position. The switch arm 48 is positioned to open disabling switch 46 and de-energize the booster solenoid 20 shortly before the plungers 26, 28 seat against the frame 23. The solenoid 22 is configured so that its plunger 26 is fitted to pass closely through the frame 23, so that a relatively low reluctance magnetic path is now established in the structure, with the result that, in spite of the fact that the booster solenoid 20 is now de-energized, the tripping voltage, i.e. minimum voltage necessary to retain the plunger assembly 19 in the retracted position, is significantly lower than the reset voltage, i.e. the voltage necessary to retract the solenoid assembly.

An optional high reluctance gap may be inserted into the magnetic structure associated with the holding solenoid 22 to vary the tripping voltage. This is shown in FIG. 2B, and takes the form of a brass sleeve 62 coaxially accepting the plunger 28 to provide the requisite high reluctance gap between the plunger 28 and the frame 23.

Further with respect to he tripping operation, it will be noted that as the plunger assembly 19 moves from the retracted position, the switch arm 48 will be released, thereby closing the disabling switch 46, and once again re-energizing the booster solenoid 20. Now, however, the line voltage is below the tripping voltage, and this is insufficient to energize the solenoids to retract their plungers.

An optional remotely operated tripping switch 64 may be provided to allow the operator to trip the power line circuit breaker 56 by removing electrical power from solenoids 20, 22. The use of rectifying diodes provides D.C. power to energize the solenoids 20,22 causing them to have greater pulling and holding strength as compared to A.C. powered coils and further reduces chattering or buzzing between the plungers and the frame 23.

Although the preferred embodiment uses a pair of solenoids, it is clear that alternative forms of booster and holding coil arrangements may be employed without departing from the scope of the invention. Thus, for example, a single solenoid having a single plunger may be employed, the solenoid having a winding tap, and the switch being arranged to selectively energize the portions of the solenoid between a relatively low strength holding condition and a relatively high strength condition for retraction. These and other variants evident to those knowledgeable in the art are to be construed as being within the scope of the invention and the claims.

While the invention has been described with reference to a preferred embodiment, it will be understood by those skilled in the art that various changes and modifications may be made and equivalents may be substituted for elements thereof without departing from the broader aspects of the invention and the scope of protection is only limited by the scope of the accompanying claims,

We claim:

1. An undervoltage tripping unit for resettable power line circuit breaker means having line and load terminal means adapted for connection to a line and a load and a release member coupled to open said circuit breaker means when moved in a given direction to a tripping position, said tripping unit comprising:

solenoid means including plunger means operable between extended and retracted positions and configured for engagement with said release member so as to move said release member to said tripping position responsive to movement of said plunger means to said extended position, spring biasing means for urging said plunger means to said extended position, coil means disposed to attract said plunger means to said retracted position, and connection means for connecting said coil means to said line, terminal means including switching means for varying the excitation of said coil means and operable to a given excitation condition when said plunger means is in said extended position and to a lower excitation condition when said plunger means is in said retracted position, said given and lower excitation conditions being chosen so that a power line voltage above a given reset voltage will energize said coil means to retract said plunger means from said extended to said retracted position and so that said plunger means will remain in said retracted position at a tripping voltage below said reset voltage, and wherein said coil means includes a holding coil and a booster coil disposed about said plunger means and said switching means is configured to selectively energize said booster coil over a range of plunger means positions from said extended position to a point closely proximate to said retracted position.

2. The tripping unit of claim 1 wherein said plunger means includes a pair of separate plungers, said coils are separately disposed each about a different one of said plungers, and said plungers are coupled so as to move together.

3. The tripping unit of claim 2 wherein at least one of said coils has associated therewith a magnetically permeable structure configured to provide a magnetic field return path from one end of said coil to the other, and said structure is configured to provide at least one low-permeability gap of chosen reluctance in said path when the associated plunger is in said retracted position.

4. The tripping unit of claim 3 wherein said booster coil has associated therewith a magnetically permeable essentially gapless structure configured to provide a magnetic field return path from one end of said holding coil to the other.

5. The tripping unit of claim 4 wherein said circuit breaker means is an alternating current circuit breaker means and said solenoid means includes rectifier means for providing direct current to at least one of said coils.

6. The tripping unit of claim 5 wherein said rectifier means is configured to provide direct current to both of said coils.

7. The tripping unit of claim 1 wherein said circuit breaker means includes a surrounding housing having an aperture in a face thereof and cover plate means adapted for sealing emplacement over said aperture, said tripping unit includes mounting means for mounting said unit on said cover plate means and is configured for insertion into said aperture to engage said release member with said cover plate means emplaced and to be removable therefrom by removal of said plate, and said connection means includes at least one detachable connector for making connection to said tripping unit.

8. The tripping unit of claim 1 wherein said booster coil is configured to be energized well in excess of its long-term safe operating level.

9. An undervoltage tripping unit for a resettable a.c. power line circuit breaker having line and load terminals adapted for connection to electrical power lines and a release member coupled to open said circuit breaker when moved in a given direction to a tripping position, said tripping unit comprising:

a holding solenoid and a booster solenoid adapted for connection to connection means each solenoid having a coil and a plunger operable between extended and retracted positions, said solenoids being configured so that said holding and booster solenoids will retract said plungers responsive to a power line voltage in excess of a given reset voltage and so that said holding solenoid will maintain a retracted plunger position responsive to the presence of power line voltages above a tripping voltage having a value below said reset voltage, said plungers being coupled to move together and being engageable with said release member and being disposed to operate said release member to said tripping position responsive to movement of said plungers to said extended position;

a pair of spring biasing elements for urging said plungers to said extended position; and a disabling switch, responsive to plunger position, for disabling electrical power flow to said booster solenoid in said retracted position.

10. The tripping unit of claim 9 further including rectifiers for providing direct current from said line terminals to energize said coils.

11. The tripping unit of claim 9 wherein said booster solenoid is configured to be energized well in excess of its long-term safe operating level.

12. The tripping unit of claim 9 wherein said solenoids have associated therewith a magnetically permeable structure configured to provide magnetic field return paths from one end of each of said coils to its opposite end, said permeable structure being configured to provide a low-permeability gap in the return path associated with said holding solenoid when its associated plunger is in said retracted position.

13. The tripping unit of claim 9 wherein said circuit breaker has associated therewith a surrounding housing having an aperture in a face thereof and a cover plate adapted for sealing emplacement over said aperture, said tripping unit is removably mountable on said cover plate and is configured for insertion into said aperture to engage said release member with said cover plate emplaced and to be removable therefrom by removal of said plate.

* * * * *